(12) United States Patent
Matsushita

(10) Patent No.: US 7,055,902 B2
(45) Date of Patent: Jun. 6, 2006

(54) VEHICLE SEATS

(75) Inventor: Katsuyuki Matsushita, Toyota (JP)

(73) Assignee: Toyota Boshoku Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 10/977,125

(22) Filed: Oct. 29, 2004

(65) Prior Publication Data

US 2005/0168039 A1   Aug. 4, 2005

(30) Foreign Application Priority Data

Oct. 14, 2003  (JP)  .............................. 2004-300204
Oct. 31, 2003  (JP)  .............................. 2003-372198

(51) Int. Cl.
  *A47C 31/02*  (2006.01)
  *A47C 7/00*  (2006.01)
  *B60N 2/02*  (2006.01)
  *B60N 2/235*  (2006.01)

(52) U.S. Cl. ................................ 297/218.1; 297/218.3; 297/218.5; 297/361.1; 297/440.15; 297/452.11; 297/452.18

(58) Field of Classification Search ........... 297/440.15, 297/452.11, 452.18, 218.3, 218.4, 218.5, 297/361.1, 367, 218.1, 218.2

See application file for complete search history.

(56) References Cited

U.S. PATENT DOCUMENTS 5,979,980 A    11/1999  Amorin et al.
6,612,648 B1 *  9/2003  Hashiguchi .......... 297/218.5 X

FOREIGN PATENT DOCUMENTS

| JP | 03-89700 | 12/1991 |
| JP | 05-68399 | 9/1993 |
| JP | 06-13697 | 2/1994 |
| JP | 06-59151 | 8/1994 |
| JP | 06-72734 | 11/1994 |
| JP | 08-332289 | 12/1996 |
| JP | 2002-159378 | 6/2002 |
| JP | 2003-320881 | 11/2003 |

* cited by examiner

Primary Examiner—Rodney B. White
(74) Attorney, Agent, or Firm—Patterson, Thuente, Skaar & Christensen, P.A.

(57) ABSTRACT

Vehicle seats may include a seat cushion covered with an outer cover, a seat back covered with an other outer cover, and a seat reclining mechanism rotatably connecting the seat cushion and the seat back such that the seat back can be tilted. One of the outer cover of the seat cushion and the outer cover of the seat back includes an opening corresponding to the seat reclining mechanism, a side slot joined with the opening, and lining members disposed on an inner surface of one of the outer cover of the seat cushion and the outer cover of the seat back. The lining members are positioned around the opening and across the slot. The lining members are coupled with each other, thereby forming a coupling portion therein.

12 Claims, 11 Drawing Sheets

VEHICLE SEATS

BACKGROUND OF TH INVENTION

1. Field of the Invention

The present invention relates to a vehicle seat including a seat back and a seat cushion that are connected to each other via a seat reclining mechanism. More particularly, the present invention relates to a vehicle seat including a seat back and a seat cushion that are connected to each other via a seat reclining mechanism in which the seat back and the seat cushion are covered with outer covers.

2. Description of the Related Art

Typically, a known vehicle seat includes a seat cushion and a seat back. The seat cushion is constituted of a cushion frame, a pad attached to the cushion frame, and a skin layer or outer cover that covers or encloses the pad. Similarly, the seat back is constituted of a back frame, a pad attached to the back frame, and a skin layer or outer cover that covers or encloses the pad. The back frame of the seat back is rotatably connected to the cushion frame of the seat cushion via a pair of seat reclining mechanisms so that the seat back can be tilted. In addition, the vehicle seat includes a pair of outer shield members or outer caps. The outer caps are positioned on the outer surface of the cushion frame so as to conceal the seat reclining mechanisms.

The outer cover of the seat back is formed with a pair of side openings that are positioned on the lower portion thereof. Each of the side openings has a shape corresponding to the profile of the seat reclining mechanism. In addition, the outer cover is formed with a rear transverse slot. The slot extends between the side openings and is continued to or joined with the side openings at a joining portion. The outer cover thus constructed is placed over the pad attached to the back frame through the rear slot such that the seat reclining mechanisms are positioned or received within the side openings.

Generally, the inner surface of the outer cover is provided with a pair of reinforcing devices such as plastic plates or flat fasteners. These reinforcing devices are disposed around the side openings so that the outer cover can be made rigid around the side openings. Thus, the outer cover can be effectively prevented from turning outward or inward along the side openings when the seat back is repeatedly tilted.

Such a known vehicle seat is taught, for example, by Japanese Laid-Open Utility Model Publication Number 3-89700.

SUMMARY OF THE INVENTION

It is, accordingly, one object of the present teachings to provide an improved vehicle seat.

In one aspect of the present teachings for example, a vehicle seat may include a seat cushion covered with an outer cover, a seat back covered with an other outer cover, and a seat reclining mechanism rotatably connecting the seat cushion and the seat back such that the seat back can be tilted. One of the outer cover of the seat cushion and the outer cover of the seat back includes an opening corresponding to the seat reclining mechanism, a side slot joined with the opening, and lining members disposed on an inner surface of one of the outer cover of the seat cushion and the outer cover of the seat back. The lining members are positioned around the opening and across the slot. The lining members are coupled with each other, thereby forming a coupling portion therein.

According to the present teachings, the outer cover can be reliably prevented from turning outward or inward around the opening when the seat back is repeatedly tilted. Therefore, the outer cover does not interfere with the related parts of the vehicle seat. As a result, the outer cover does not undesirably affect the reclining operation of the seat back.

Other objects, features, and advantages of the present invention will be readily understood after reading the following detailed description together with the accompanying drawings and claims.

DETAILED DESCRIPTION OF THE INVENTION

A representative example of the present invention has been described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the foregoing detailed description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present teachings.

A detailed representative embodiment of the present teachings is shown in FIG. 1 to FIG. 13, in which a bench seat is exemplified as a vehicle seat.

Figure 1:
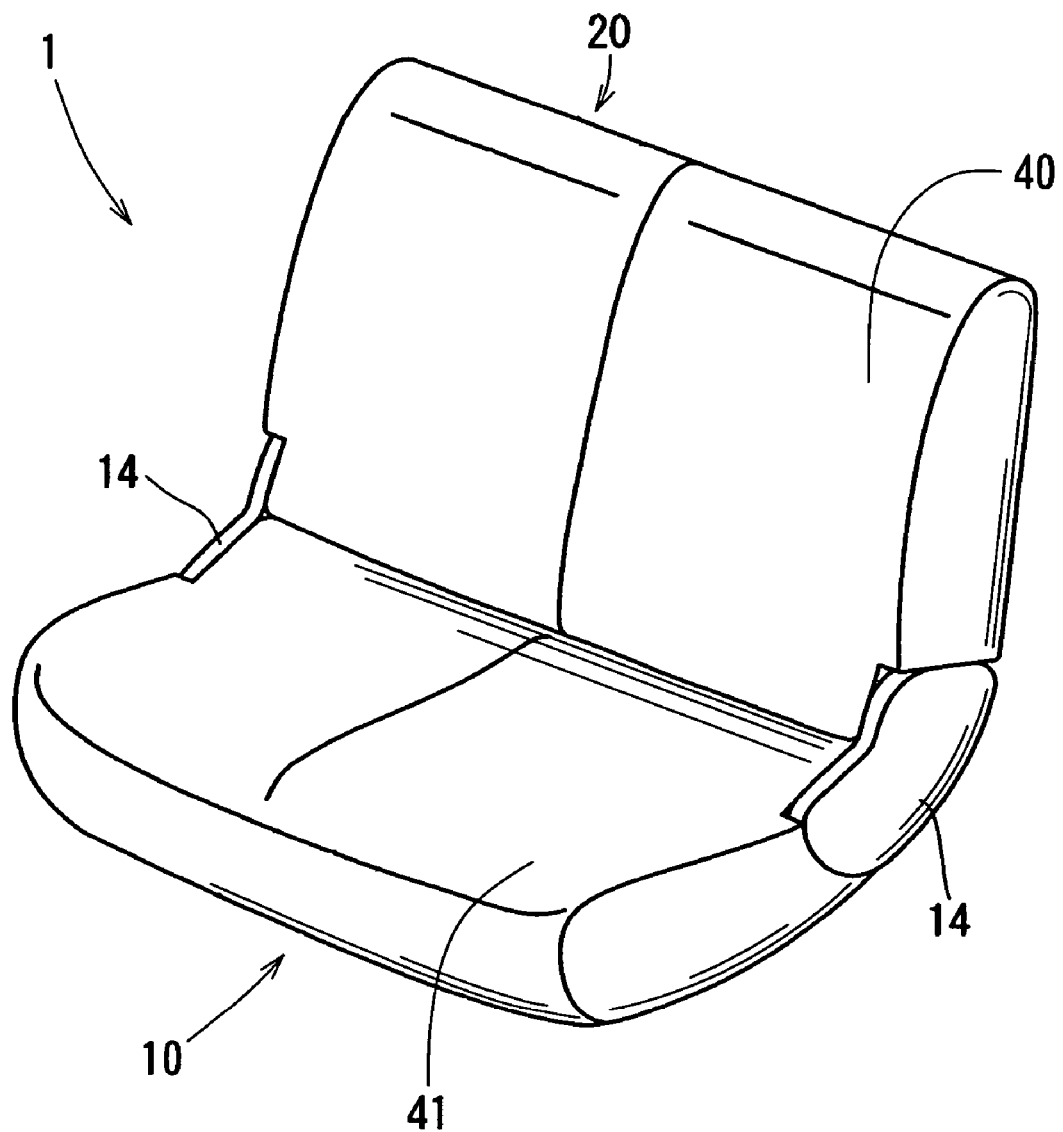
FIG. 1 is a perspective view of a vehicle seat of the present teachings.
Figure 2:
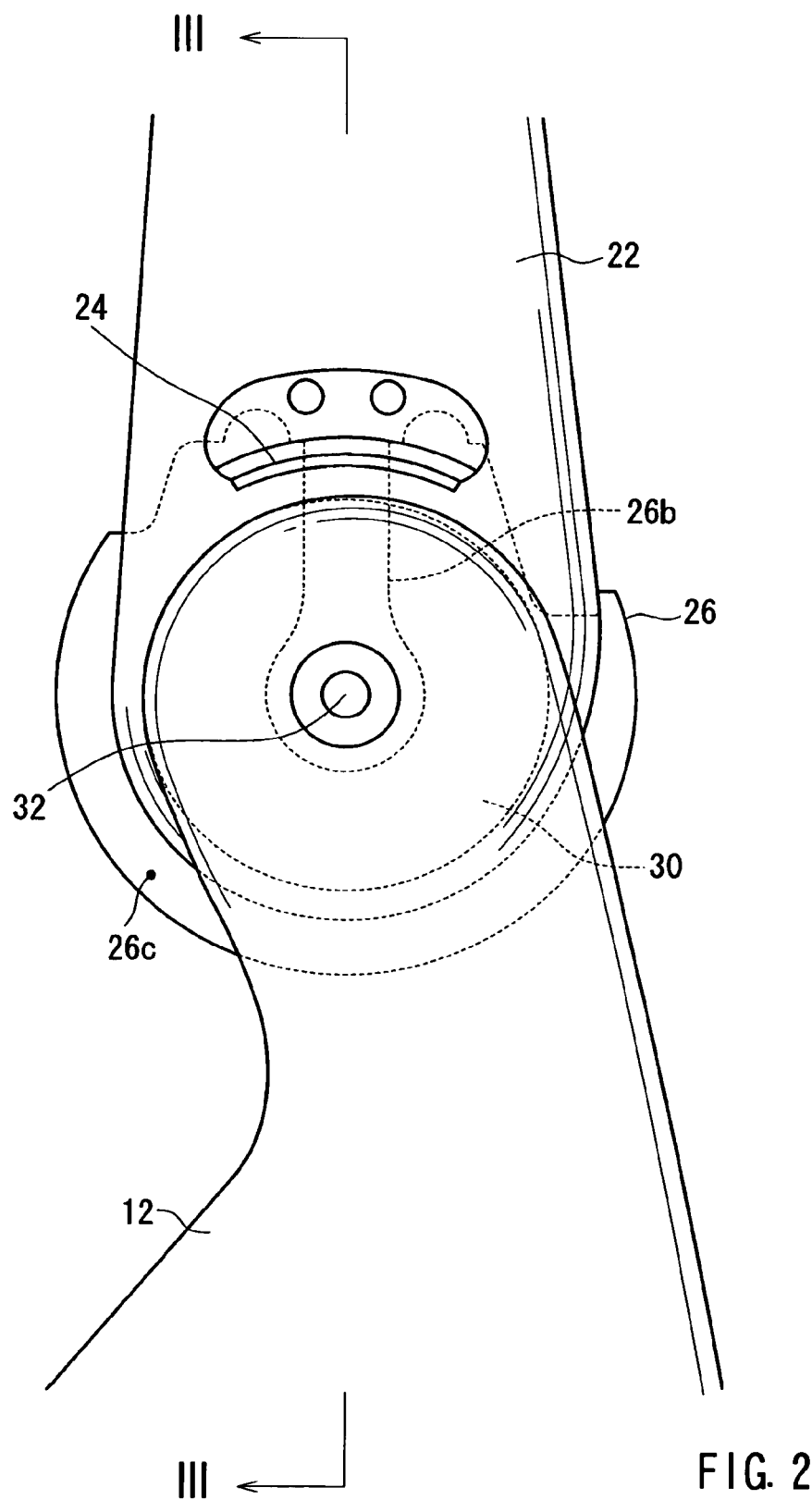
FIG. 2 is an enlarged side view of a cushion frame and a back frame that are connected via a seat reclining mechanism.
Figure 3:
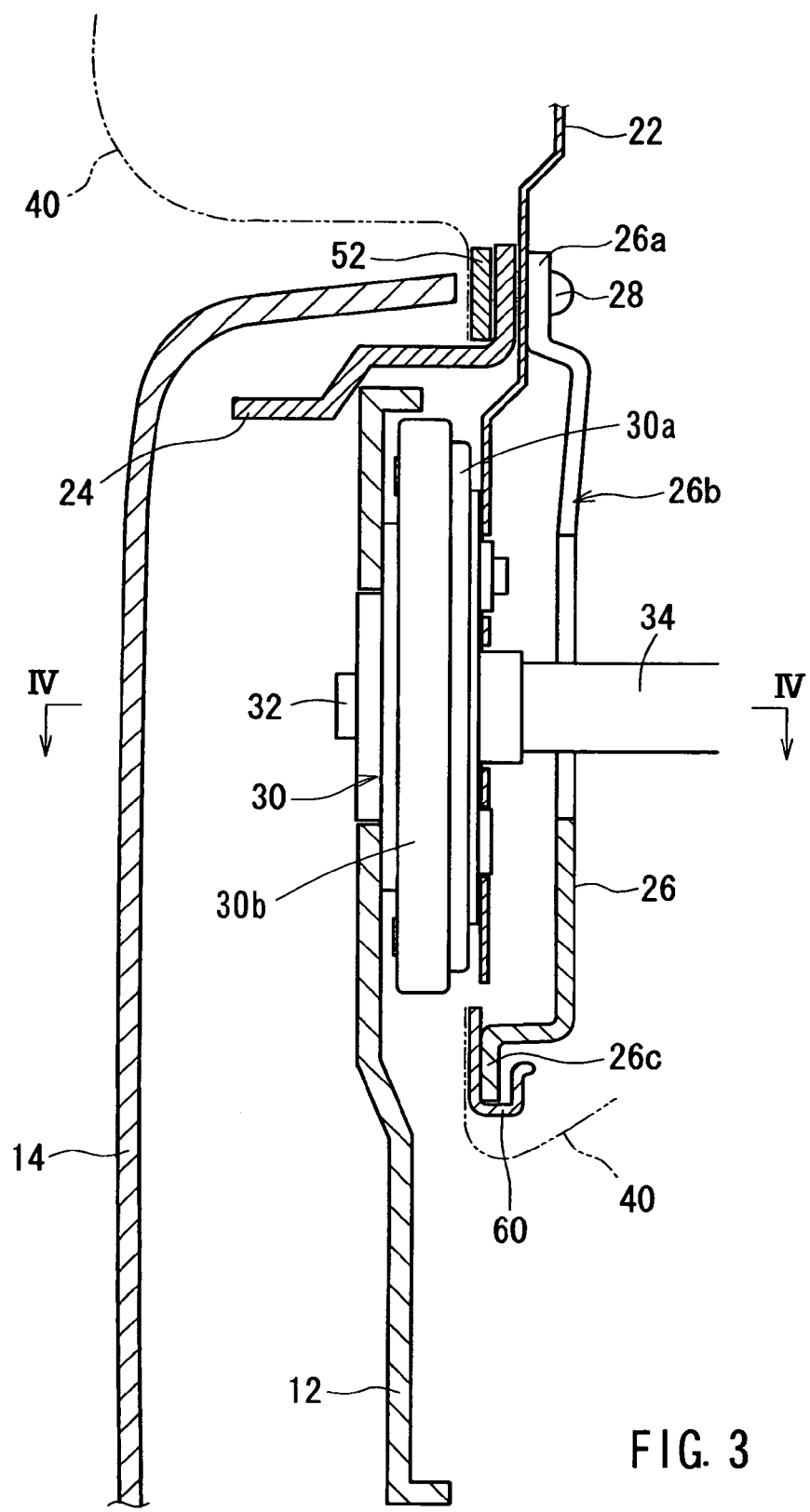
FIG. 3 is a cross-sectional view taken along line III—III in FIG. 2.
Figure 4:
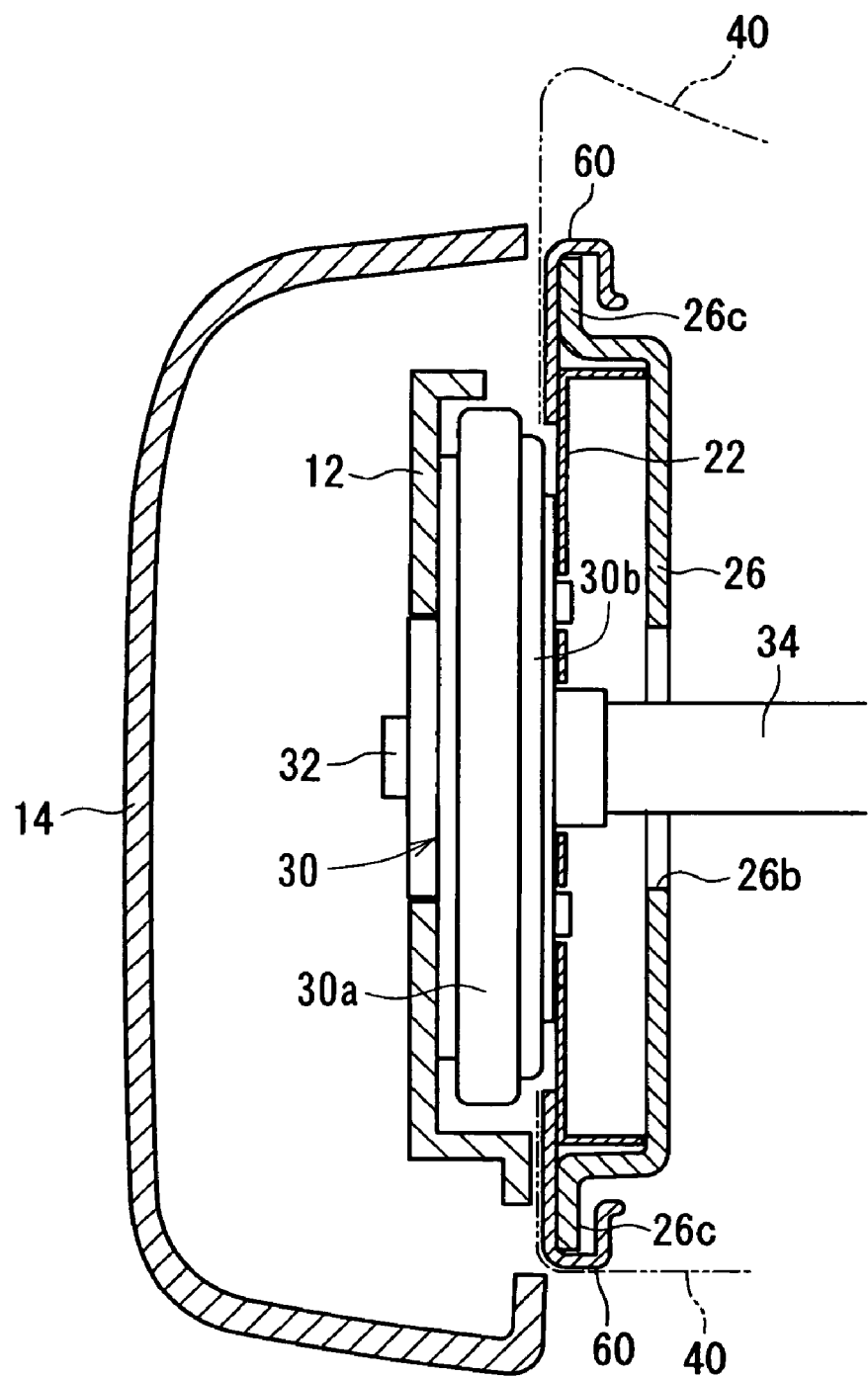
FIG. 4 is a cross-sectional view taken along line IV—IV in FIG. 3.

As shown in FIG. 1, a vehicle seat 1 includes a seat cushion 10 and a seat back 20. The seat cushion 10 may preferably be constituted of a cushion frame 12 (FIG. 2), a pad (not shown) attached to the cushion frame 12, and a skin layer or outer cover 41 (FIG. 1) that covers or encloses the pad. Similarly, the seat back 20 may preferably be constituted of a back frame 22 (FIG. 2), a pad (not shown) attached to the back frame 22, and a bag-shaped skin layer or outer cover 40 (FIG. 1) that covers or encloses the pad. As shown in FIGS. 2 to 4, the cushion frame 12 of the seat cushion 10 is rotatably connected to the back frame 22 of the seat back 20 via a pair of round seat reclining mechanisms 30 (one of which is shown). As will be appreciated, the seat reclining mechanisms 30 allow the back frame 22 to be rotated forward and rearward (i.e., counterclockwise and clockwise in FIG. 2) around rotational shafts 32 and be locked to a desired rotational position. This allows the seat back 20 to be adjusted to a desired tilting position.

As shown in FIGS. 3 and 4, each of the seat reclining mechanisms 30 includes a pair of opposing disk-like housings, i.e., a first housing 30a and a second housing 30b, that are arranged and constructed to rotate around the rotational shaft 32. The first and second housings 30a and 30b are respectively affixed to the cushion frame 12 and the back frame 22 by an appropriate bonding means such as welding. The first and second housings 30a and 30b are circumferentially connected by a fastener or clip ring (not shown) so that the second housing 30b can move or rotate relative to the first housing 30a around the rotational shaft 32. Further, the respective rotational shafts 32 are interconnected via a connecting shaft 34.

As shown in FIGS. 2 and 3, the back frame 22 is provided with a pair of stopper members 24 (one of which is shown). The stopper members 24 are positioned above the seat reclining mechanisms 30 and affixed to the back frame 22 so as to project outwardly. The stopper members 24 are arranged and constructed to contact the cushion frame 12 so as to restrict a rotation angle of the back frame 22 when the seat back 20 is tilted.

As shown in FIGS. 1, 3 and 4, the vehicle seat 1 may include a pair of outer shield members or outer caps 14 that are positioned over the outer surface of the cushion frame 12. Thus, outer sides of the respective seat reclining mechanisms 30 are concealed or covered by the outer caps 14. Typically, the outer caps 14 are made from resinous materials. Also, the vehicle seat 1 may include a pair of inner shield members or inner caps 26 that are positioned over the inner surface of the back frame 22. Thus, inner sides of the respective seat reclining mechanisms 30 are concealed or covered by the inner caps 26. Typically, the inner caps 26 are made from resinous materials.

Figure 5:
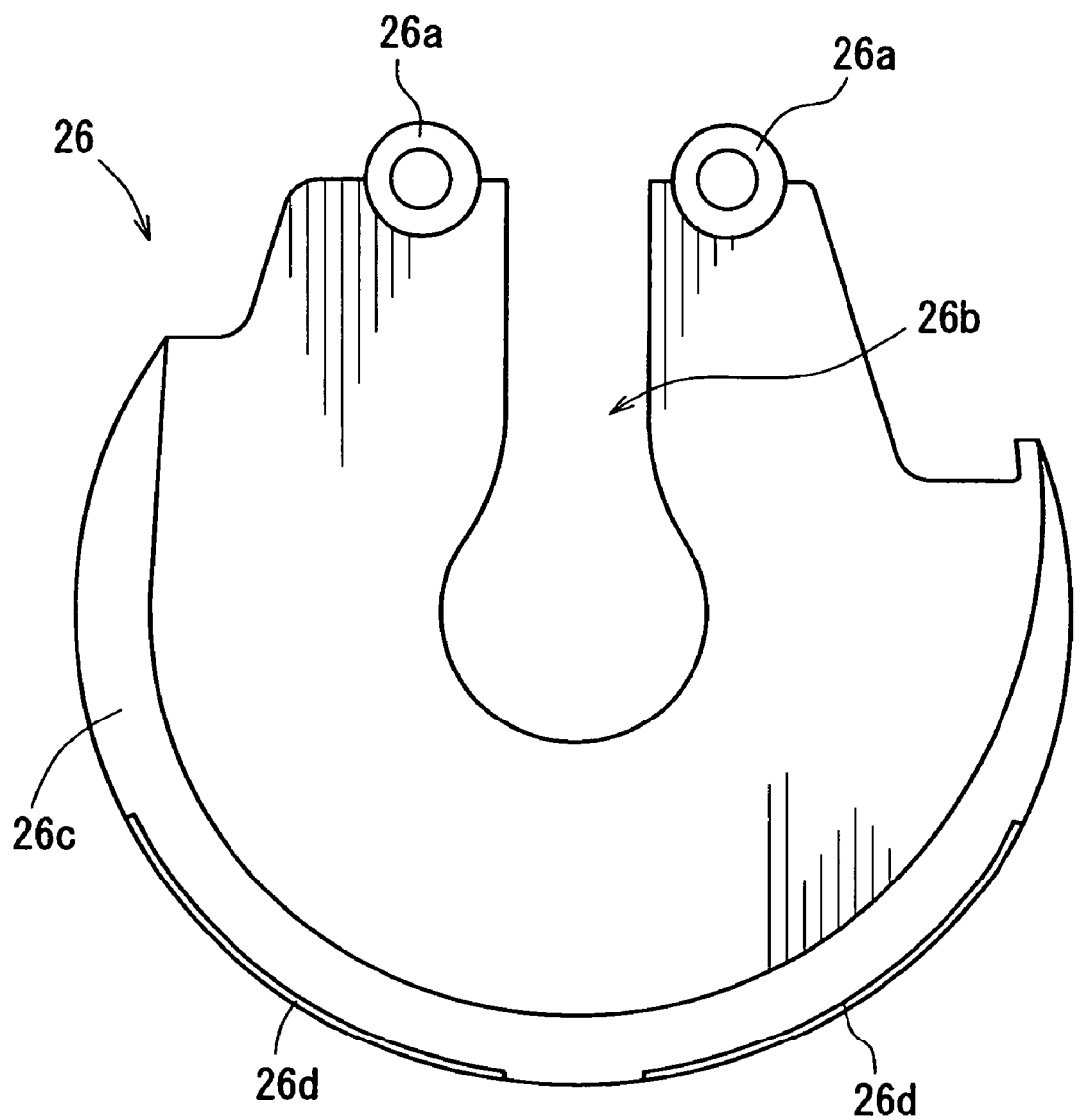
FIG. 5 is a plan view of an inner cap.
Figure 6:
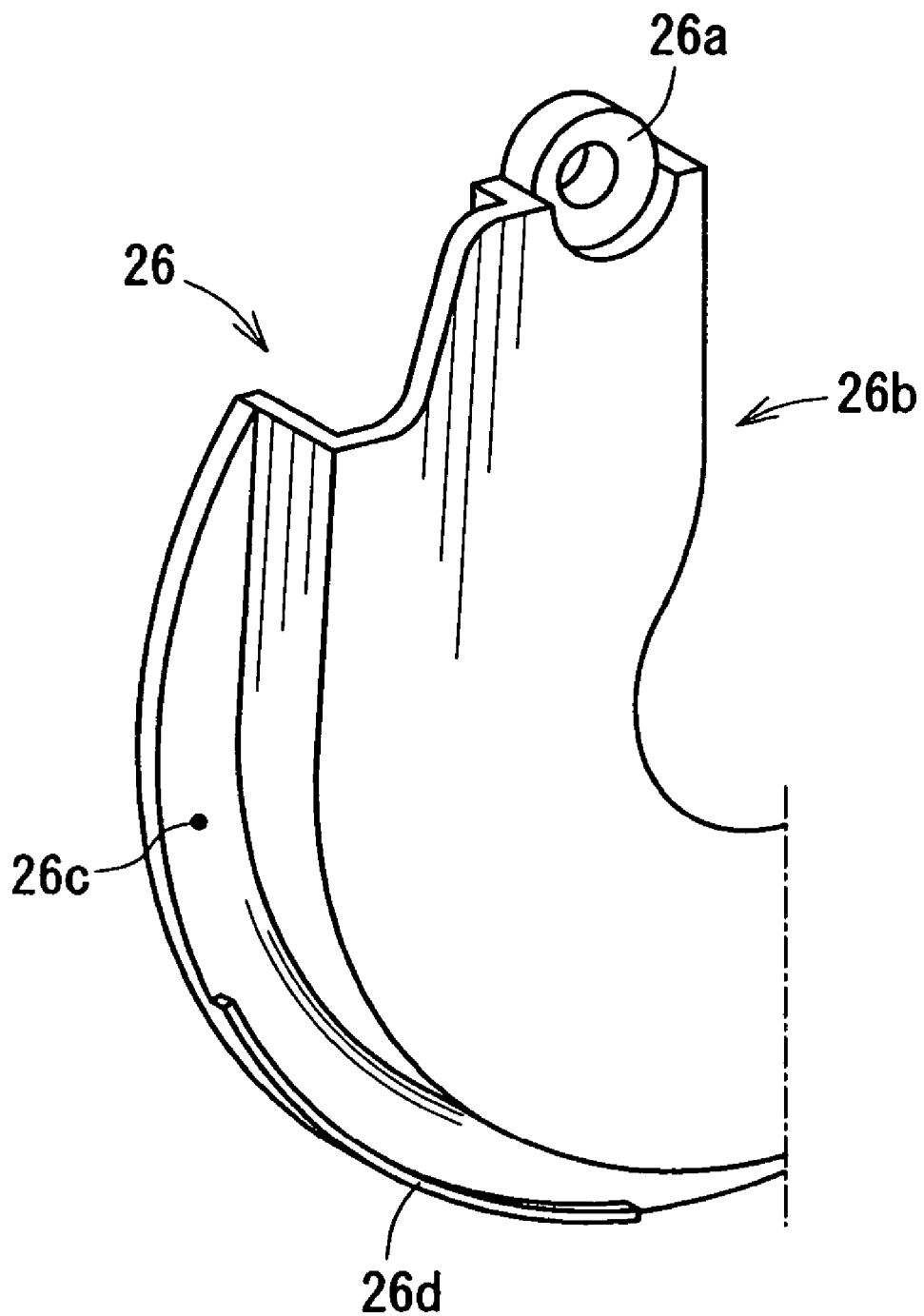
FIG. 6 is a partially perspective view of the inner cap.

As shown in FIGS. 5 and 6, each of the inner caps 26 has a substantially semicircular cap body and includes a central vertical slot 26b that is formed in the cap body so as to upwardly open. Also, the inner cap 26 has a pair of upper attachment portions 26a that are positioned across the slot 26b. Further, the inner cap 26 has a substantially semicircular outer flange 26c that extends along the periphery of the cap body. The outer flange 26c is provided with a pair of curved projections 26d that are formed along the periphery thereof so as to project inwardly. It is noted that the projections 26d are used to engage lining members 60, which will be described below.

As shown in FIG. 3, the inner cap 26 is attached to the back frame 22 at the attachment portions 26a via connector pins 28. When the inner cap 26 is attached to the back frame 22, the central slot 26b may preferably receive the connecting shaft 34 (FIGS. 3 and 4) and the outer flange 26c may preferably be positioned around the lower rounded peripheral edge of the back frame 22 (FIG. 2).

Figure 7:
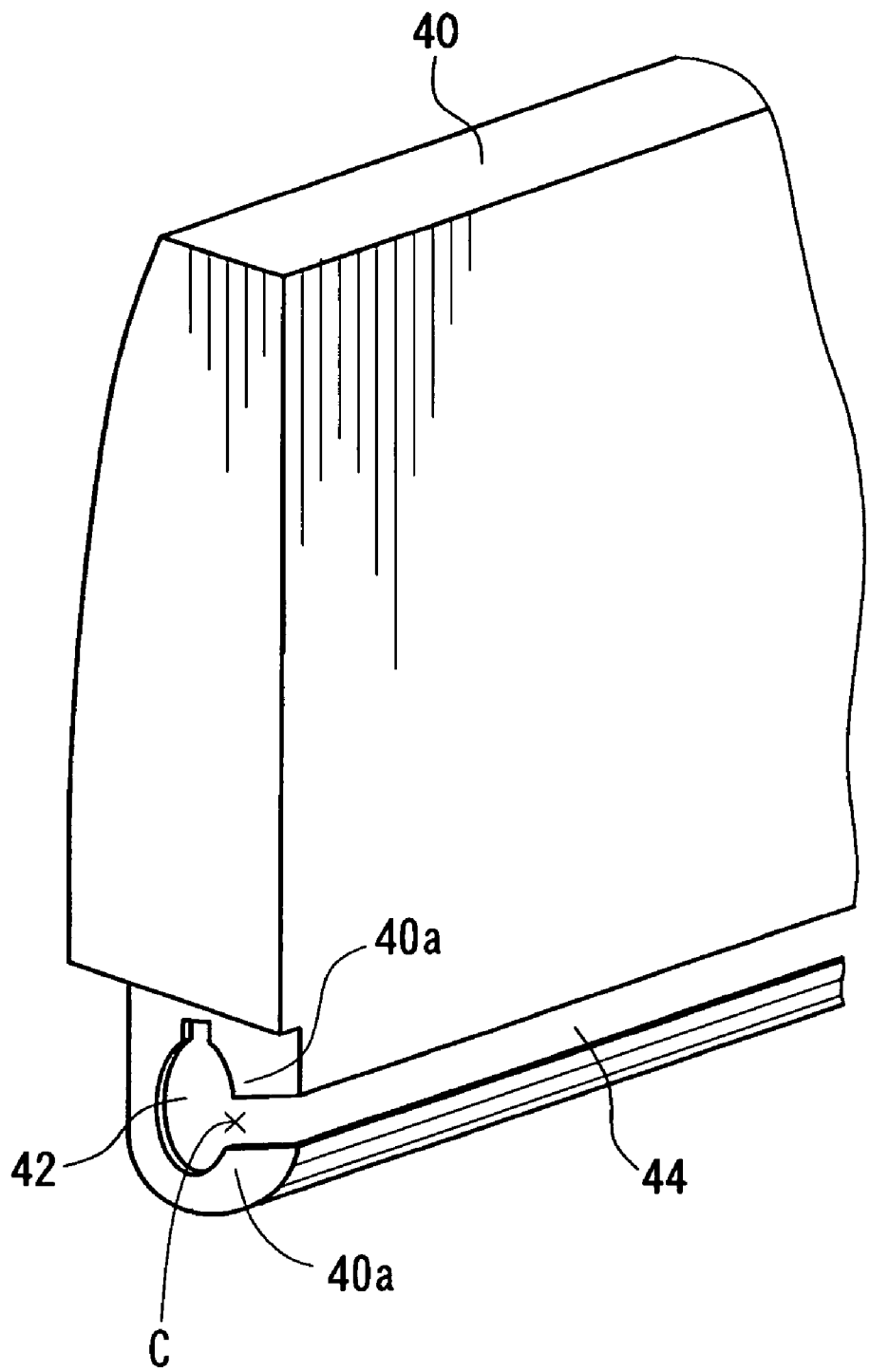
FIG. 7 is a perspective view of an outer cover of a seat back.

As shown in FIG. 7, the outer cover 40 of the seat back 20 is configured to conform to the shape of the vehicle seat and is formed with a pair of side openings 42 (one of which is shown) that are positioned on the lower portion thereof.

Each of the side openings 42 has a shape that corresponds to the profile of the seat reclining mechanism 30. In addition, the outer cover 40 is formed with a rear transverse slot 44. The slot 44 extends between both side openings 42 and is continued to or joined with the side openings 42 at a joining portion C, thereby forming an access opening in the outer cover 40. Typically, the outer cover 40 may preferably be provided with a commonly used fastener (not shown) along the rear slot 44. As will be recognized, the outer cover 40 thus constructed may preferably be placed on the pad attached to the back frame 22 through the rear slot 44.

The inner surface of the outer cover 40 is provided with a pair of (left and right) reinforcing devices. Because the left and right reinforcing devices have the same constructions, except that they are mirror images of each other, only the construction of the left reinforcing device will be described herein.

Figure 8:
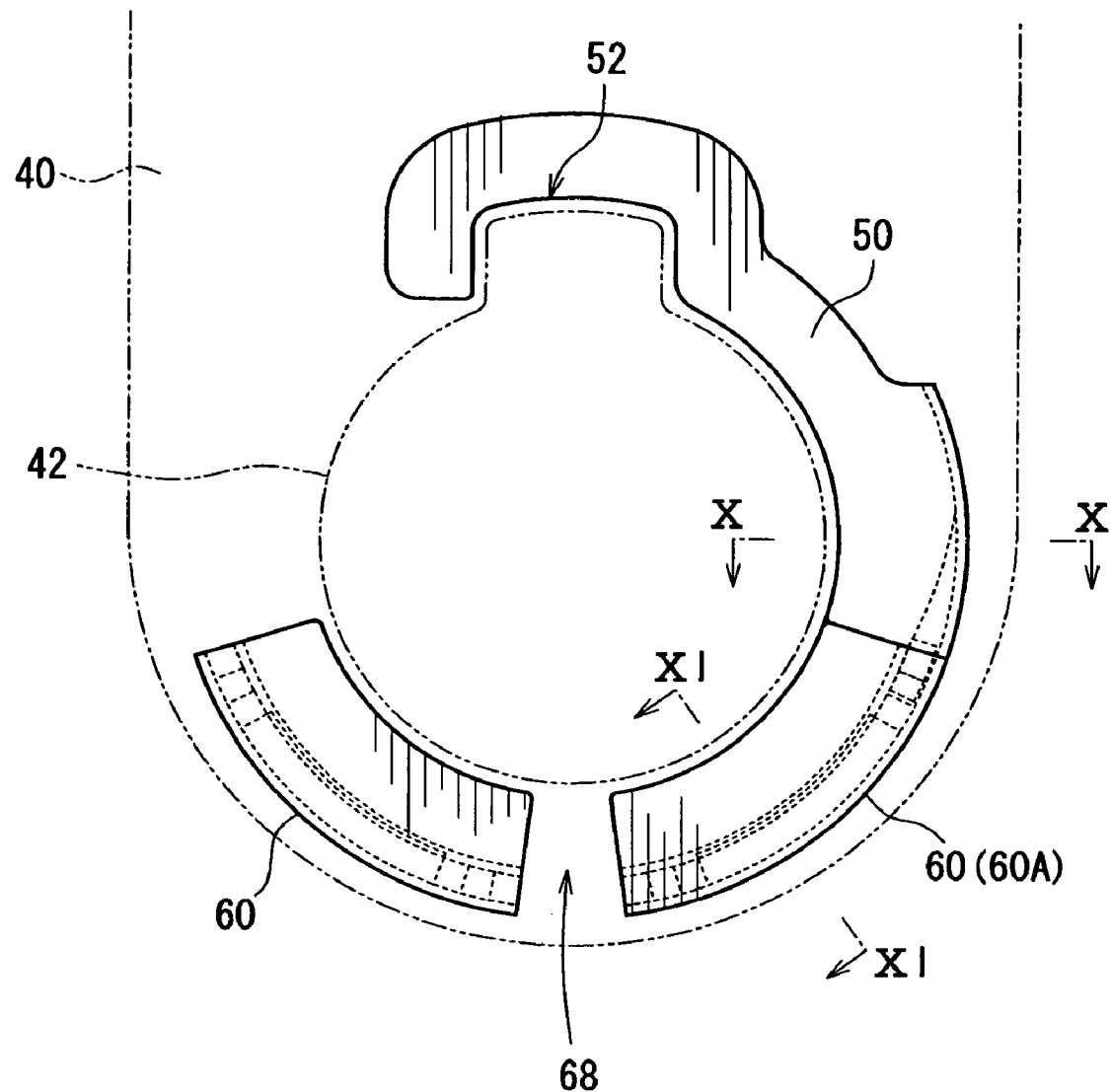
FIG. 8 is a partially enlarged side view of the outer cover having first and second lining members.
Figure 9:
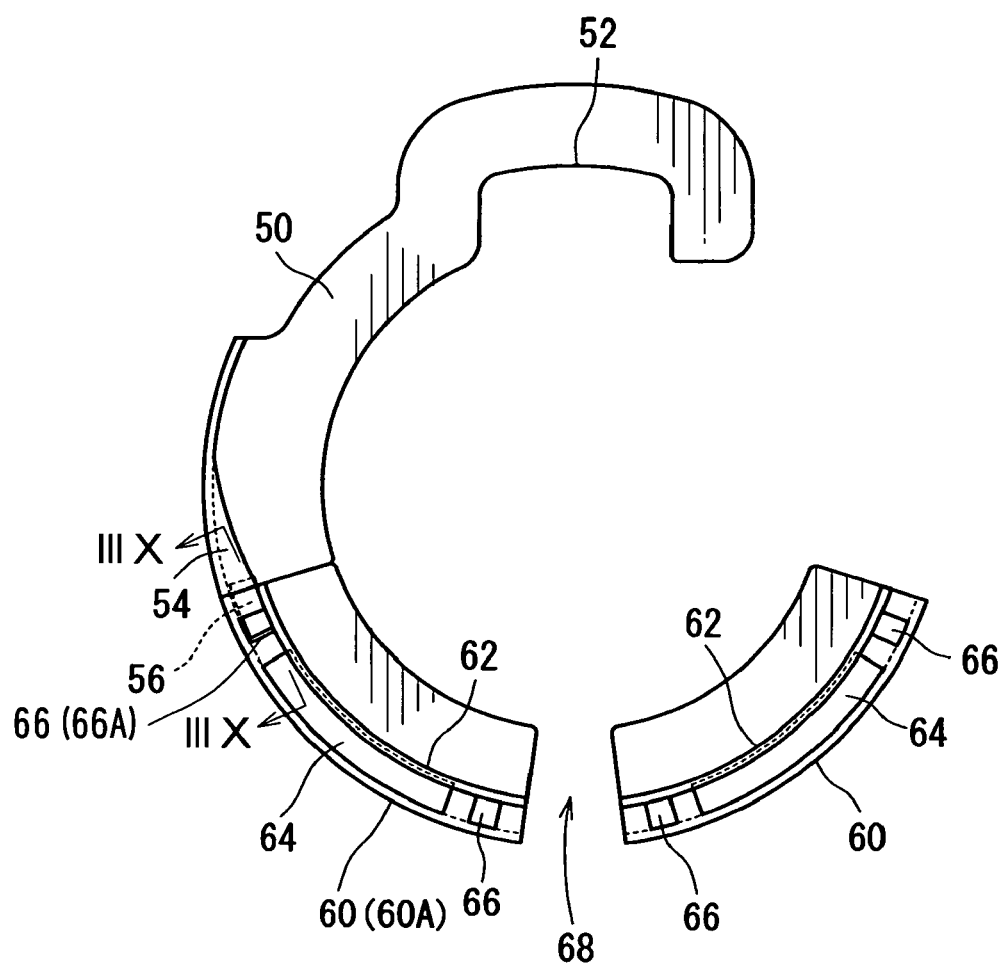
FIG. 9 is a plan view of the first and second lining members.

As shown in FIGS. 8 and 9, the (left) reinforcing device is constituted of a first reinforcing member or lining member 50 and a pair of second reinforcing members or lining members 60. The lining members 50 and 60 are disposed around the side opening 42. The first lining member 50 is a plate-like member having an arcuate shape corresponding to the contour of the side opening 42 and having substantially an even thickness throughout. The first lining member 50 may preferably be formed from resinous materials. Also, the second lining members 60 have the same shape as one another and are positioned to be spaced via a desired interval 68. Each of the second lining members 60 is a plate-like member having an arcuate shape corresponding to the contour of the side opening 42 and substantially having an even thickness throughout. The second lining member 60 may preferably be formed from resinous materials. The lining members 50 and 60 may preferably be stitched to the outer cover 40. Typically, the first lining member 50 may preferably be positioned on the upper portion of the side opening 42 and the second lining members 60 may preferably be positioned on the lower portion of the side opening 42. As will be easily understood, the first lining member 50 and one of the second lining members 60 are positioned across the rear transverse slot 44 of the outer cover 40.

Figure 10:
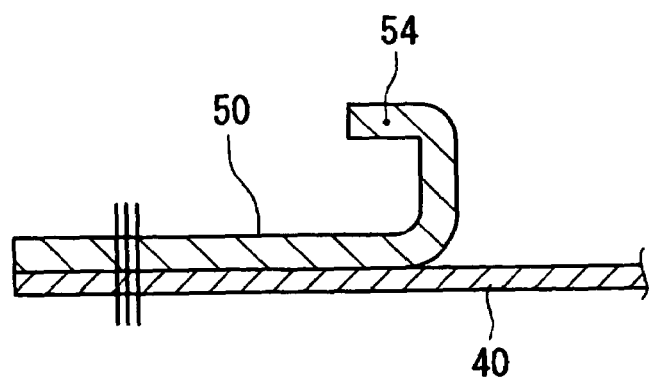
FIG. 10 is a cross-sectional view taken along line X—X in FIG. 8.
Figure 12:
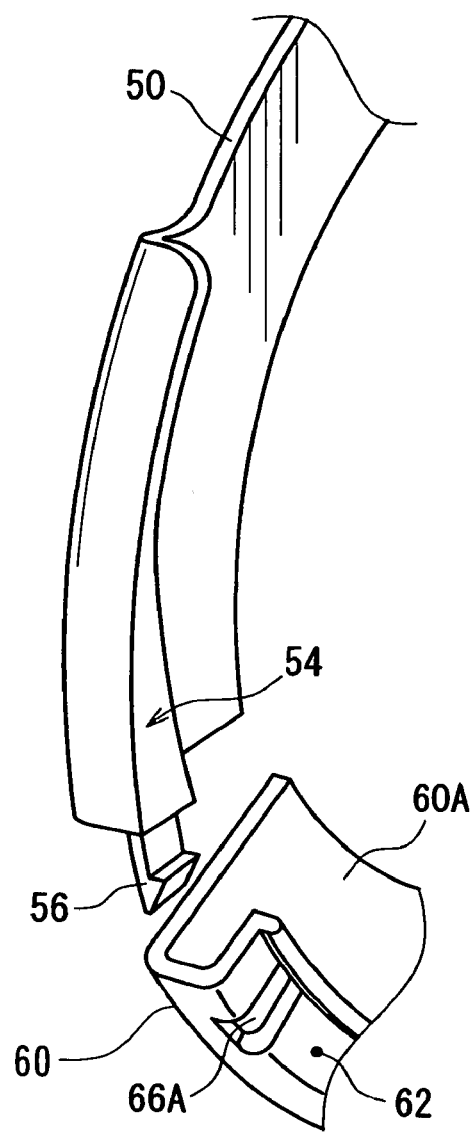
FIG. 12 is a partially perspective view of the first and second lining members.

As shown in FIGS. 8 and 9, the first lining member 50 has an upper hook portion 52 that can engage the stopper members 24 attached to the back frame 22. As best shown in FIGS. 10 and 12, the first lining member 50 has a raised portion 54 that is inwardly folded or raised from the outer periphery thereof. As will be apparent, the raised portion 54 may preferably be formed in the lower end portion of the first lining member 50. As best shown in FIG. 12, the raised portion 54 is formed with an engagement pin 56 that projects toward the second lining member 60.

Figure 11:
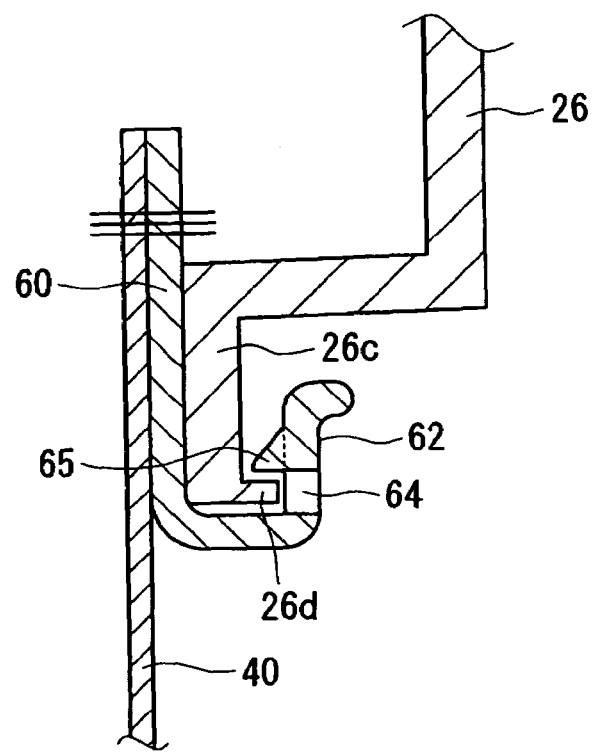
FIG. 11 is a cross-sectional view taken along line XI—XI in FIG. 8.

As best shown in FIGS. 11 and 12, the second lining member 60 has a raised portion 62 that is inwardly folded or raised from the outer periphery thereof. As shown in FIG. 9, the raised portion 62 may preferably be formed so as to extend over the entire length of the second lining member 60. The raised portion 62 has substantially the same shape as the raised portion 54 of the first lining member 50 in cross section. The raised portion 62 is arranged and constructed to receive the outer flange 26c of the inner cap 26 that is attached to the back frame 22. As best shown in FIG. 9, the raised portion 62 is formed with a central elongated slot 64 and a pair of end engagement apertures 66.

Typically, the central elongated slot 64 is arranged and constructed to correspond to the projections 26d of the inner cap 26. In addition, as shown in FIG. 11, the raised portion 62 is formed with an elongated engagement projection 65 that extends along the central elongated slot 64. As will be apparent from FIG. 11, the engagement projection 65 (i.e., engagement portion) may effectively engage the projections 26d of the inner cap 26 when the outer flange 26c of the inner cap 26 is received in the raised portion 62. Further, the central elongated slot 64 does not have a structurally significant function. In other words, the slot 64 is simply formed so as to facilitate stripping of the engagement projection 65 during the molding operation of the second lining member 60.

Figure 13:
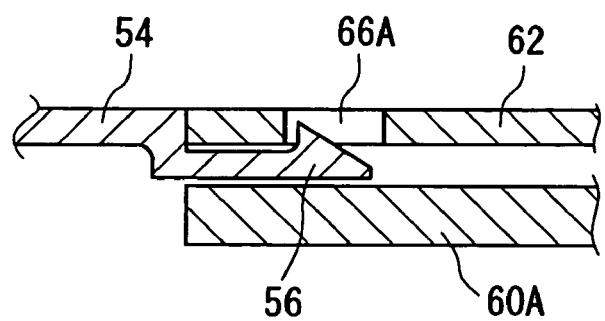
FIG. 13 is a cross-sectional view taken along line XIII—XIII in FIG. 9.

As shown in FIGS. 9, 12, and 13, in one of the second lining members 60 (which will be hereinafter referred to as "a second lining member 60A") that is positioned adjacent to the first lining member 50, the engagement aperture 66 (which will be hereinafter referred to as "a engagement aperture 66A") that is positioned adjacent to the first lining member 50, is arranged and constructed to engage the engagement pin 56. Therefore, when the first lining member 50 is aligned with and butted to the second lining member 60A, the engagement pin 56 formed in the raised portion 54 of the first lining member 50 may preferably engage the engagement aperture 66A formed in the raised portion 62 of the second lining member 60A (FIGS. 9 and 13). As a result, the first lining member 50 and the second lining member 66A are connected to or coupled with each other, thereby forming a coupling portion therein. Further, the engagement pin 56 and the engagement aperture 66A are referred to as "a connecting member" herein.

It is noted that the other of the second lining member 60 that is positioned away from the first lining member 50 is intended to be used in the right reinforcing device and not used in the left reinforcing device.

A representative method for attaching the outer cover 40 on the pad attached to the back frame 22 will now be described.

First, the outer cover 40 may preferably be placed on the pad attached to the back frame 22 through the rear slot 44 such that the seat reclining mechanism 30 may preferably be positioned or received within the side opening 42. Thereafter, the upper hook portion 52 of the first lining member 50 is engaged with the stopper member 24 that is attached to the back frame 22. Subsequently, the outer flange 26c of the inner cap 26 that is attached to the back frame 22 is received in the raised portions 62 of the second lining members 60 so that the projections 26d of the inner cap 26 are aligned with the central elongated slots 64 formed in the raised portions 62. As a result, the engagement projections 65 formed in the raised portions 62 engages the projections 26d of the inner cap 26 (FIG. 11). As will be recognized, at this time, the first lining member 50 is separated from the adjacent second lining member 60A (FIG. 12). Thereafter, the first lining member 50 is moved toward the adjacent second lining member 60A so that the raised portion 54 of the first lining member 50 is butted to the raised portion 62 of the second lining member 60A. As a result, the engagement pin 56 formed in the raised portion 54 of the first lining member 50 engages the engagement aperture 66A formed in the raised portion 62 of the second lining member 60A (FIGS. 9 and 13). Thus, the first lining member 50 and the second lining member 60A are connected to each other, thereby forming the coupling portion therein. Consequently, the rear slot 44 of the outer cover 40 is effectively closed because the first lining member 50 and the second lining member 60A are positioned across the rear transverse slot 44 finally, the fastener attached to the outer cover 40 is closed so that the rear slot 44 of the outer cover 40 can be closed.

When the first lining member 50 is connected to the second lining member 60A, the first lining member 50 can be evenly connected to the second lining member 60A at the coupling portion because the raised portion 54 of the first lining member 50 has substantially the same cross sectional shape as the raised portion 62 of the second lining member 60A. Further, the first and second lining members 50 and 60 may have a low skin friction because they are formed from resinous materials. Therefore, these lining members do not obstruct the motion of related parts of the vehicle seat 1.

According to the present embodiment, the rear transverse slot 44 of the outer cover 40 can be closed. Therefore, even if the seat back 20 is repeatedly tilted (i.e., even if the back frame 22 is rotated forward and rearward many times), the outer cover 40 can be effectively prevented from turning outward or inward at portions 40a (FIG. 7) adjacent to the joining portion C of the side opening 42 and the transverse slot 44. As a result, the outer cover 40 does not interfere with the related parts of the vehicle seat 1.

Also, the stopper member 24 and the inner cap 26 are respectively conventional components and not specially designed components. Therefore, it is not necessary to use additional special purpose members for performing the present invention.

Further, when the pad of the vehicle seat 1 has a complicated shape, the outer cover 40 is made by sewing two pieces together in order to conform to such a complicated shape. In such a case, the second lining members 60 can be stitched to the outer cover 40 so that the interval 68 between the second lining members 60 is aligned with the sewing line formed in the outer cover 40. Therefore, when the outer cover 40 is made from two pieces, the outer cover 40 can be easily placed on the pad without producing wrinkles thereon.

Although the present invention is described with reference to the outer cover 40 of the seat back 20, the present invention can be applied to the outer cover 41 of the seat cushion 10. That is, the first and second lining members 50 and 60 can be attached to the outer cover 41 of the seat cushion 10. As will be recognized, if the first and second lining members 50 and 60 are intended to be attached to the outer cover 41 of the seat cushion 10, the first and second lining members 50 and 60 are designed so that the raised portions 54 and 62 are raised outwardly. In such a case, the second lining members 60 can be modified such that the engagement projections 65 formed therein engage the periphery of the outer cap 14.

In addition, although a pair of second lining members 60 that are divided via the interval 68 are used in this embodiment, a single second lining member (not shown) can be used, if necessary.

The invention claimed is:

1. A vehicle seat comprising a seat cushion covered with a first outer cover, a seat back covered with a second outer cover, and a seat reclining mechanism rotatably connecting the seat cushion and the seat back such that the scat back can be tilted, one of the first or second outer covers comprising:
a side opening corresponding to the seat reclining mechanism;
a slot operably connected to the side opening; and
a plurality of lining members disposed on an inner surface of one of the first or second outer covers,
wherein the plurality of lining members are located peripherally to the side opening and traverses the slot, and
wherein the plurality of lining members are coupled with each other, thereby forming a coupling portion therein.

2. The vehicle seat as defined in claim 1, wherein an engagement pin formed in one of the plurality of lining members engages an engagement aperture formed in another of the plurality of lining members thereby forming the coupling portion of the plurality of lining members.

3. The vehicle seat as defined in claim 1 wherein at least one of the plurality of lining members comprises an engagement portion that engages a shield member that is positioned over a back frame for covering the seat reclining mechanism.

4. The vehicle seat as defined in claim 1, wherein at least one of the plurality of lining members comprises a hook portion that can engage a stopper member of a back frame.

5. The vehicle seat as defined in claim 1, wherein the plurality of lining members respectively comprise raised portions having the same height, and wherein the coupling portion is formed in the raised portions.

6. The vehicle seat as defined in claim 1, wherein one of the plurality of lining members is divided via an interval that is positioned forward of the slot.

7. The vehicle seat as defined in claim 1, wherein the plurality of lining members have an even thickness throughout and are evenly butted and connected to each other.

8. In a vehicle seat comprising a seat cushion and a seat back covered with a bag-shaped seat cover, the seat back being rotatably connected to the seat cushion by a seat reclining mechanism so that a rotation angle of the seat back can be adjusted, the seat cover comprising:
   a circular opening corresponding to the seat reclining mechanism, the opening being arranged and constructed so as not to cover the seat reclining mechanism;
   a slot operably connected to the circular opening so as to form an access—opening in the seat cover; and
   a pair of lining members disposed on the seat cover,
   wherein the lining members are located peripherally to the opening and traverse the slot,
   wherein the lining members are releasably connected to each other,
   wherein one of the lining members engages the seat back so as to be prevented from moving linearly along an axis of the seat reclining mechanism, and
   wherein the other of the lining member engages the seat back so as to be prevented from rotating about an axis of the seat reclining mechanism.

9. The seat cover as defined in claim 8 further comprising an additional lining member that is disposed on the seat cover so as to be spaced from the lining members at a desired interval.

10. The seat cover as defined in claim 9, wherein at least one of one of the lining members or the additional lining member engages the seat back so as to be prevented from moving in a radial direction from the seat reclining mechanism.

11. The seat cover as defined in claim 9, wherein the slot is formed in a rear side of the seat back.

12. The vehicle seat as defined in claim 1, wherein one of the plurality of lining members engages the seat back so as to be prevented from moving in a radial direction from the seat reclining mechanism.

\* \* \* \* \*